US006981712B2

(12) United States Patent
Takano

(10) Patent No.: US 6,981,712 B2
(45) Date of Patent: Jan. 3, 2006

(54) BODY FRAME DAMPING STRUCTURE IN A SADDLE-TYPE VEHICLE

(75) Inventor: Kazuhisa Takano, Shizuoka (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 10/623,473

(22) Filed: Jul. 18, 2003

(65) Prior Publication Data

US 2004/0124604 A1 Jul. 1, 2004

(30) Foreign Application Priority Data

Jul. 19, 2002 (JP) ............................. 2002-211833
Feb. 19, 2003 (JP) ............................. 2003-041540

(51) Int. Cl.
*B62K 25/28* (2006.01)

(52) U.S. Cl. ...................................... 280/283; 180/227

(58) Field of Classification Search ................ 280/283, 280/281.1; 180/227, 219
See application file for complete search history.

(56) References Cited

U.S. PATENT DOCUMENTS 4,650,026 A 3/1987 Shiraishi
4,706,774 A 11/1987 Tsuboi
4,753,314 A 6/1988 Tsukiji
4,805,717 A * 2/1989 Trema ........................ 180/219
5,226,674 A * 7/1993 Buell et al. ................. 280/284
5,335,929 A * 8/1994 Takagaki et al. ............ 280/283
5,456,482 A * 10/1995 Rau, III ...................... 280/283
5,498,013 A * 3/1996 Hwang ....................... 280/283
5,975,230 A 11/1999 Bourget
6,131,934 A 10/2000 Sinclair

FOREIGN PATENT DOCUMENTS

| | | |
|---|---|---|
| EP | 0 082 496 | 6/1983 |
| EP | 0 769 447 | 4/1997 |
| EP | 1 223 101 | 7/2002 |
| JP | 62-39389 | 2/1987 |
| JP | 2001-138978 | 5/2001 |

* cited by examiner

*Primary Examiner*—Tony Winner
(74) *Attorney, Agent, or Firm*—Hogan & Hartson, LLP

(57) ABSTRACT

A body frame damping structure in a saddle-type vehicle includes a front fork steerably supported at a front end portion of a body frame and a front wheel supported at lower end portions of the front fork. The body frame damping structure also includes a rear arm pivotally supported at a rear portion of the body frame by a pivot support shaft so as to be swingable up and down and a rear wheel supported at a swinging end of the rear arm. Dampers are disposed so as to bridge a first portion of the body frame with a second portion of the body frame, with dampers being respectively coupled to the first and second portions of the body frame.

13 Claims, 7 Drawing Sheets

BODY FRAME DAMPING STRUCTURE IN A SADDLE-TYPE VEHICLE

BACKGROUND OF THE INVENTION

1. Technical Field of the Invention

The present invention relates to a body frame damping structure in a saddle-type vehicle disposed with a damping force generating means that is disposed so as to bridge portions of the body frame with other portions of the body frame. With the damping force generating means being respectively coupled, the portions and the other portions are elastically deformed when an impact force is applied to the body frame by the road surface.

2. Prior Art

Conventionally, there are saddle-type vehicles. A vehicle is disposed with a body frame configuring a frame of the vehicle body, a front fork steerably supported at a front end portion of the body frame, a front wheel supported at lower end portions of the front fork, a rear arm pivotally supported by a pivot support shaft at a rear portion of the body frame so as to be swingable up and down, a rear wheel supported at a swinging end of the rear arm, and dampers included inside the front fork and disposed so as to bridge the body frame and the rear arm.

The body frame is disposed with a head pipe that configures the front end portion of the body frame and supports the front fork, a frame body that extends rearward and downward from the head pipe and supports the rear arm at extension portions of the frame body, a seat bracket that extends rearward from the frame body and supports a seat, and an internal combustion engine that is supported at the frame body and is interlocked and coupled with the rear wheel. The body frame is supported on a traveling road surface by the front and rear wheels.

At the time the vehicle is traveling due to driving of the internal combustion engine, an impact force is applied to the body frame from the traveling road surface via the front and rear wheels, regardless of the presence of the dampers. Here, because it is difficult for the impact force applied to the body frame from the traveling road surface to be damped by the body frame itself when the rigidity of the body frame is too high, the vehicle tends to travel while bouncing from the traveling road surface each time the impact force is applied to the body frame. However, this action of the vehicle is not preferable in terms of the steering stability.

Thus, the body frame is usually made elastically deformable to a certain extent, whereby the impact force is damped so that steering stability is satisfactorily maintained when the impact force is applied to the body frame.

Incidentally, because the vehicle is of a saddle-type, the constituent parts of the vehicle are disposed compactly to make the vehicle smaller in terms of the function of the vehicle, and there is a demand to make the vehicle lighter. For this reason, it is not easy to ensure sufficient strength and rigidity for the portions of the body frame. For instance, when the vehicle is used for racing and a large impact force (kickback) is instantaneously applied to the body frame during high-speed travel, there is the potential for elastic deformation of the body frame to become large, and this large deformed state tends to persist, which also hinders steering stability and is not preferable.

Also, the cross section of the rear arm is made into a box-like shape and an interior space thereof is filled with polyurethane foam, whereby high rigidity is secured for the rear arm of the vehicle body and vibrational sound is reduced.

Incidentally, because the foam has compression strength, in a case where the rear arm is elastically deformed by an impact force, it is conceivable for the foam to work, with respect to elastic deformation in which the cross-sectional area of the rear arm is compressed, to counter this compression so that the elastic deformation is suppressed and satisfactory steering stability is maintained. However, because the foam does not include tensile strength, it is difficult for the foam to work against elastic deformation in which the cross-sectional area of the rear arm expands, so that this elastic deformation cannot be sufficiently suppressed. Thus, the above-described configuration is insufficient in terms of maintaining satisfactory steering stability by suppressing elastic deformation of the body frame resulting from the impact force.

Moreover, in terms of the properties of the foam, it is also conceivable for the working of the foam in terms of strength to be insufficient simply by applying the foam to outer surface sides of the body frame. Thus, the cross section of the body frame is made into the box-like shape and the interior space of the rear arm is filled with the foam. However, when the foam is disposed in this manner, a constraint is placed on the cross-sectional shape of the body frame and molding of the body frame tends to become cumbersome.

The present invention was devised in light of the above-described circumstances, and it is an advantage thereof to ensure that, in a case where an impact force applied to a body frame from a traveling road surface during travel of a vehicle is to be damped by elastic deformation of the body frame, the body frame is deterred from greatly elastically deforming so that the steering stability can be satisfactorily maintained when a large impact force is applied to the body frame. It is also an advantage of the invention to ensure that molding of the body frame can be achieved easily, even in such a case.

SUMMARY OF THE INVENTION

A body frame damping structure in a saddle-ridden vehicle of the invention for solving the above-described problem is as follows.

As exemplified in all of the drawings the invention of a body frame damping structure in a saddle-type vehicle includes a front fork steerably supported at a front end portion of a body frame; a front wheel supported at lower end portions of the front fork; a rear arm pivotally supported at a rear portion of the body frame by a pivot support shaft so as to be swingable up and down; and a rear wheel supported at a swinging end of the rear arm.

Damping force generating means are disposed so as to bridge portions of the body frame with other portions of the body frame, with the damping force generating means being respectively coupled to the portions and the other portions.

As exemplified in all of the drawings, the body frame includes a head pipe, which configures the front end portion of the body frame and supports the front fork, and a frame body, which extends rearward and downward from the head pipe and pivotally supports the rear arm at extension portions of the frame body. The frame body is disposed with linear portions that extend substantially straightly and the damping force generating means are disposed at outward vicinities of the linear portions so as to extend along the linear portions.

The frame body includes a pair of left and right frame bodies and the damping force generating means is disposed so as to extend in a width direction of the vehicle and bridge the left and right frame bodies, with the damping force generating means being coupled to the frame bodies.

According to another embodiment of the present invention, a body frame damping structure in a saddle-type vehicle includes a front fork steerably supported at a front end portion of a body frame; a front wheel supported at lower end portions of the front fork; a rear arm pivotally supported at a rear portion of the body frame by a pivot support shaft so as to be swingable up and down; and a rear wheel supported at a swinging end of the rear arm. The body frame includes a head pipe, which configures the front end portion of the body frame and supports the front fork, a frame body, which extends rearward and downward from the head pipe and pivotally supports the rear arm at extension portions of the frame body, and a seat bracket, which projects rearward from the frame body and supports a seat.

The damping force generating means are disposed so as to bridge the frame body and the seat bracket, with the damping force generating means being respectively coupled to the frame body and the seat bracket.

According to another embodiment of the present invention, a body frame damping structure in a saddle-type vehicle includes a front fork steerably supported at a front end portion of a body frame; a front wheel supported at lower end portions of the front fork; a rear arm pivotally supported at a rear portion of the body frame by a pivot support shaft so as to be swingable up and down; and a rear wheel supported at a swinging end of the rear arm. The body frame includes a head pipe, which configures the front end portion of the body frame and supports the front fork, a frame body, which extends rearward and downward from the head pipe and pivotally supports the rear arm at extension portions of the frame body, and an internal combustion engine, which is supported at the frame body and is interlocked and coupled with the rear wheel.

The damping force generating means are disposed so as to bridge the frame body and the internal combustion engine, with the damping force generating means being respectively coupled to the frame body and the internal combustion engine.

As exemplified in all of the drawings, the damping force generating means damp an impact force applied in one direction to the damping force generating means and an impact force applied in a direction opposite to the one direction.

DETAILED DESCRIPTION OF THE PREFERRED EMBODIMENTS

Embodiments of the invention will be described below with the drawings.

(First Embodiment)

FIGS. 1 to 4 show a first embodiment of the invention.

Figure 1:
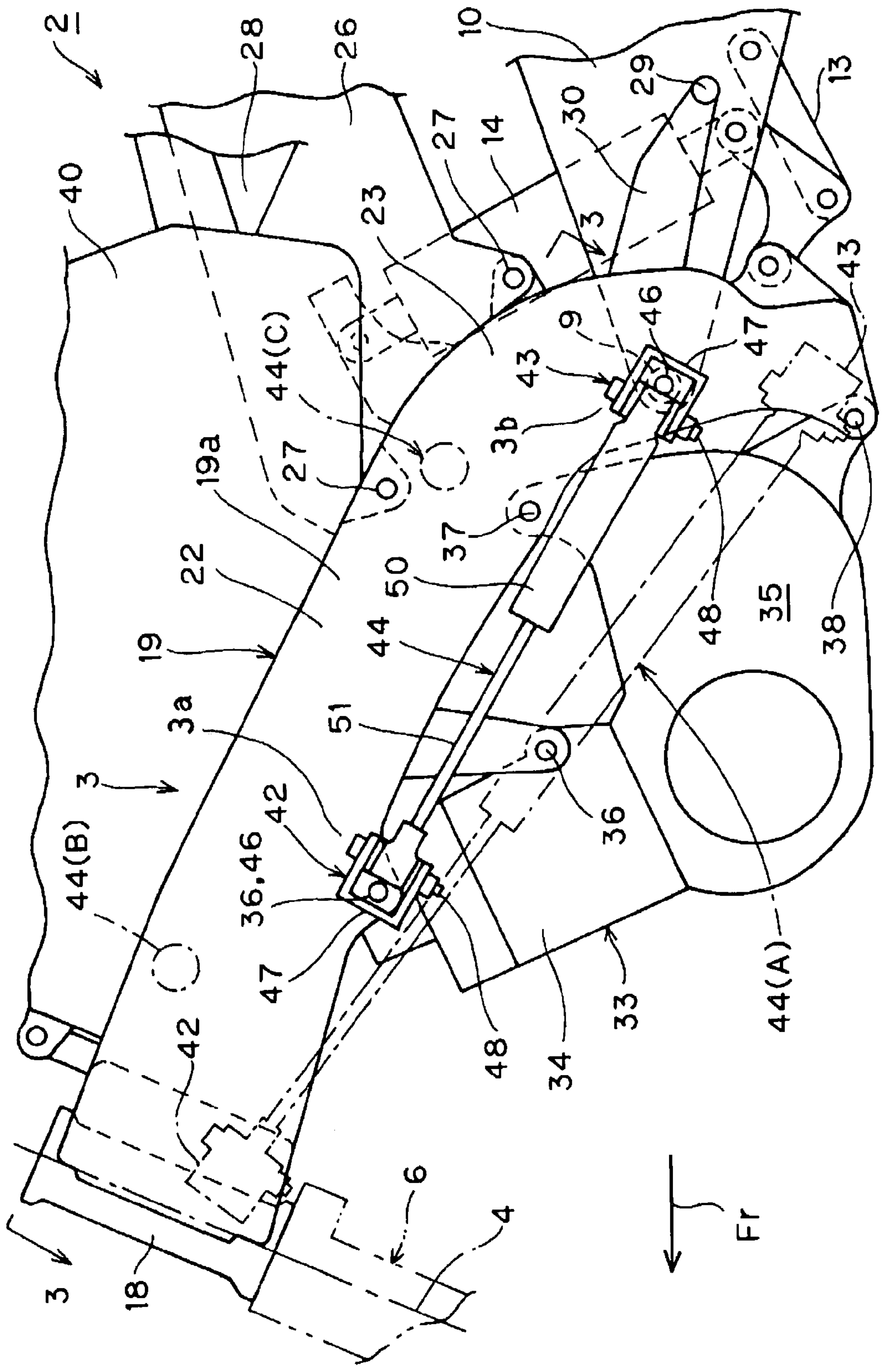
FIG. 1 illustrates a first embodiment of the present invention.
Figure 2:
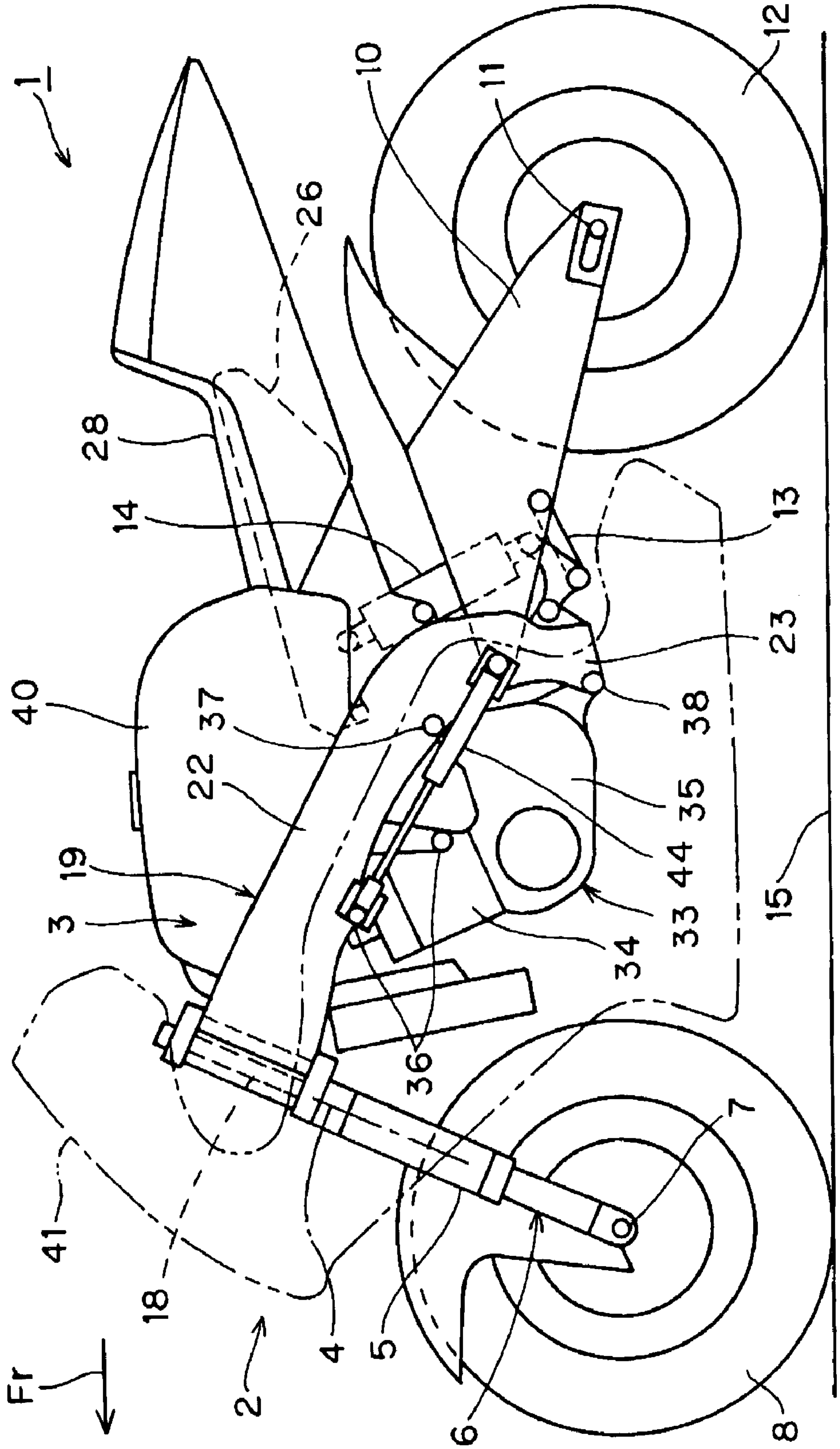
FIG. 2 illustrates a side view of the entire vehicle according to the first embodiment of the present invention.
Figure 3:
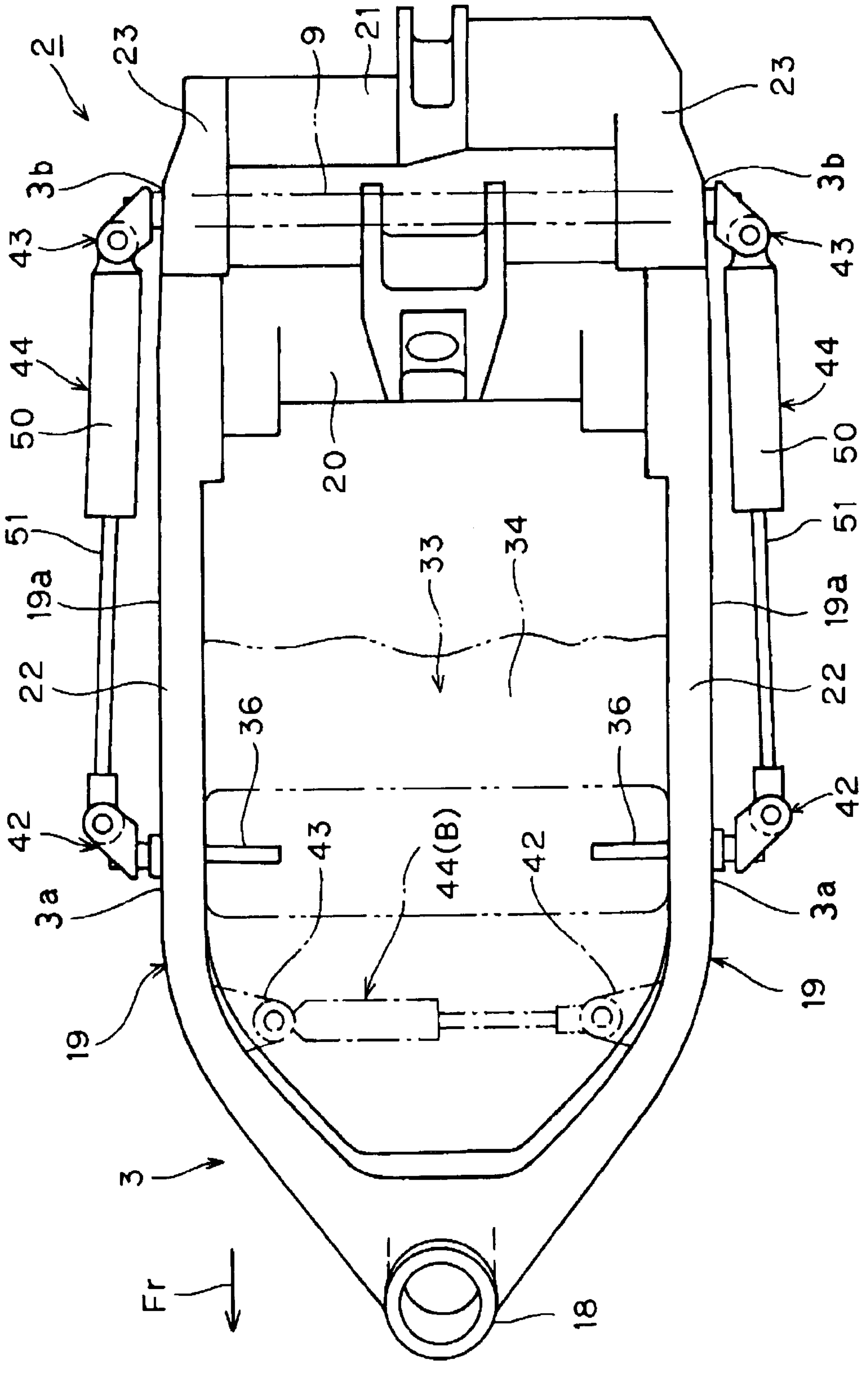
FIG. 3 illustrates the first embodiment of the present invention taken along line 3—3.
Figure 4:
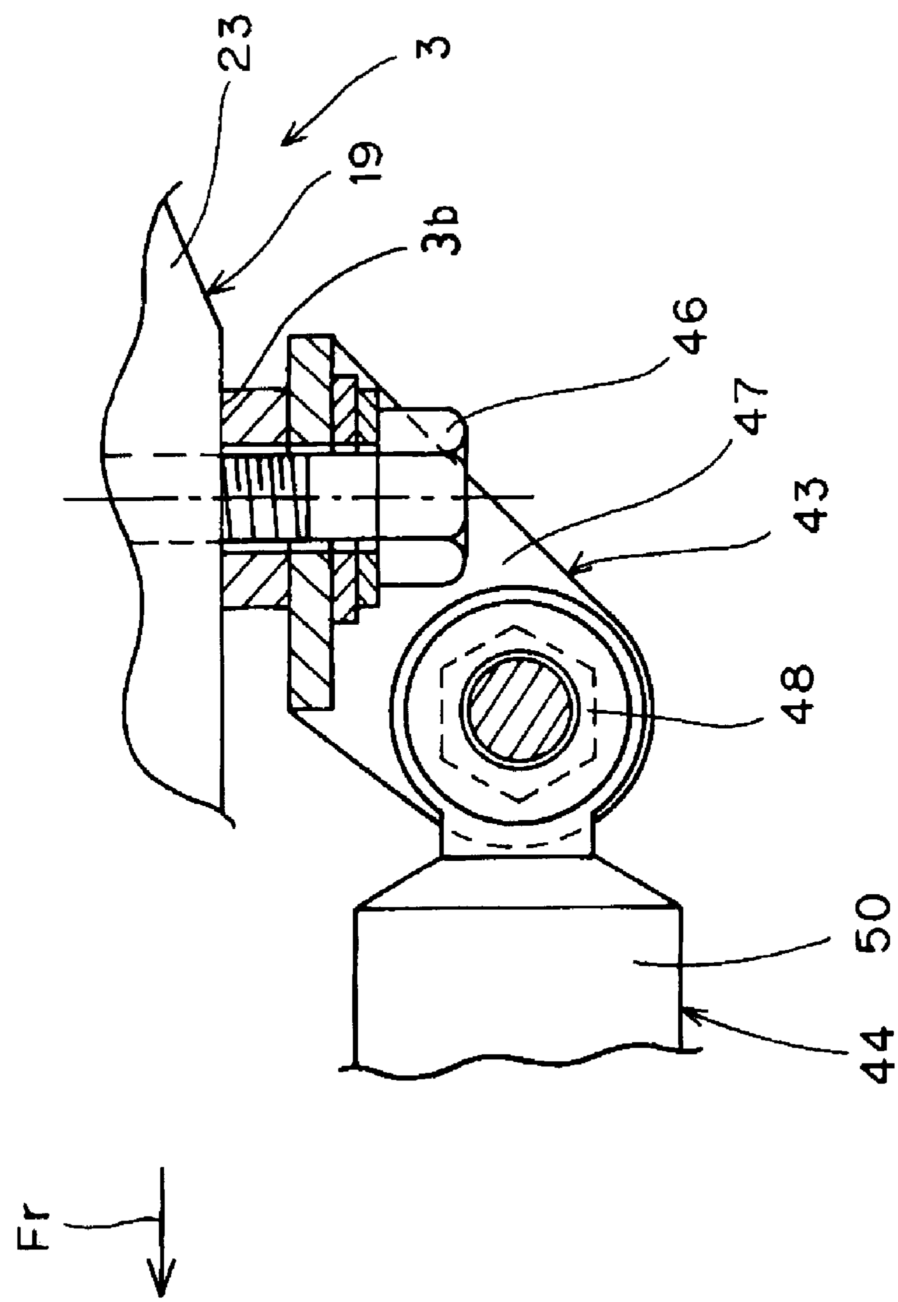
FIG. 4 illustrates a partially enlarged cross-sectional view of FIG. 3.

In FIGS. 1 to 3, reference numeral 1 is a saddle-type vehicle exemplified by a two-wheeled motor vehicle, and arrow Fr represents a front direction thereof.

The vehicle 1 is disposed with a body frame 3 configuring a frame of a vehicle body 2; a front fork 6 that is supported at a front end portion of the body frame 3 so as to be steerable around a steering axis center 4 and includes a damper 5; a front wheel 8 that is rotatably supported at lower end portions of the front fork 6 by an axle 7; and an unillustrated steering handle that is supported at an upper end portion of the front fork 6.

The vehicle 1 is also disposed with a rear arm 10 that is made of a metal plate, disposed rearward of a lower portion of the body frame 3 and extends in a front-rear direction, with a front end portion of the metal plate rear arm 10 being pivotally supported at a rear lower portion of the body frame 3 by a pivot support shaft 9 so that a rear portion of the rear arm 10 is swingable up and down; a rear wheel 12 that is rotatably supported at the swinging end portion of the rear arm 10 by an axle 11; a link mechanism 13 disposed so as to bridge the rear lower portion of the body frame 3 and a front portion of the rear arm 10; and a damper 14 disposed so as to bridge a rear upper portion of the body frame 3 and the link mechanism 13. Each of the dampers 5 and 14 is of a cylinder format using a fluid. The body frame 3 is supported on a traveling road surface 15 by the front and rear wheels 8 and 12, whereby the vehicle 1 can travel forward.

The body frame 3 is disposed with a head pipe 18 that configures the front end portion of the body frame 3 and supports the front fork 6; a pair of left and right frame bodies 19 that are made of metal plates, extend rearward and downward from the head pipe 18 and pivotally support, with the pivot support shaft 9, the rear arm 10 at extension portions of the frame bodies 19; and upper and lower cross members 20 and 21 that join mutual extension portions of the left and right frame bodies 19. The cross section of each frame body 19 in a longitudinal direction thereof has a long box-like shape.

Each frame body 19 is disposed with a main frame 22, which extends substantially straightly rearward and downward from the head pipe 18 when the vehicle body 2 is seen from the side (FIGS. 1 and 2), and a rear arm bracket 23, which configures the extension portion of the frame body 19 and integrally extends rearward and downward from an extension end portion of the main frame 22. The depression angle of the rear arm bracket 23 is larger than the rearward depression angle of the main frame 22. In other words, a joint portion at which the main frame 22 and the rear arm bracket 23 are mutually joined is formed as a curved portion. Also, when the vehicle body 2 is seen in plan view (FIG. 3), each main frame 22 has a curved shape that extends rearward and outward from the head pipe 18 and then extends substantially straightly rearward to become outwardly convex when the vehicle body 2 is seen in plan view.

Mutual upper portions and lower portions of the left and right rear arm brackets 23, 23 are respectively joined by the upper and lower cross members 20 and 21. The front end portion of the rear arm 10 is pivotally supported by the pivot support shaft 9 at intermediate portions, in the vertical direction, of the rear arm brackets 23, 23. One end portion of the link mechanism 13 is pivotally supported at the extension end portions (lower end portions) of the rear arm brackets 23, 23.

The body frame 3 is disposed with a seat bracket 26 that projects rearward and upward from the joint portions at which the main frames 22 and the rear arm brackets 23 are joined. A front end portion of the seat bracket 26 is fastened by fasteners 27 to the joint portions and cantilever-supported at the rear portion of the frame bodies 19 of the body frame 3, whereby a seat 28 is supported at the seat bracket 26. Foot rests 29 are disposed below a front end portion of the seat 28. The foot rests 29 are supported by brackets 30 at intermediate portions in the vertical direction of the rear arm brackets 23. A rider seated saddle-style in the seat 28 can place his/her feet on the foot rests 29, so that the rider can grip the handle in this posture.

A traveling drive-use drive device 33 of the vehicle 1 is disposed below the left and right main frames 22, 22 of the body frame 3. The drive device 33 is disposed with an internal combustion engine 34, which configures a front portion of the drive device 33, a power transmission device 35, which is positioned rearward of the internal combustion engine 34 and connected to the internal combustion engine 34, and unillustrated interlocking means such as a chain, which interlocks and couples the rear wheel 12 to the power transmission device 35.

An upper portion of the internal combustion engine 34 is supported by fasteners 36, 36 at intermediate portions, in the front-rear direction, of the main frames 22 of the frame bodies 19. A rear portion of the power transmission device 35 is supported by fasteners 37 and 38 at upper and lower end portions of the rear arm brackets 23 of the frame bodies 19. Thus, the internal combustion engine 34 is supported by the frame bodies 19 of the body frame 3. The internal combustion engine 34 itself has sufficient strength and rigidity and is supported so as to straddle the main frames 22 and the rear arm brackets 23 of the frames bodies 19 in the body frame 3. For this reason, the internal combustion engine 34 configures part of the body frame 3.

A fuel tank 40 is supported above the main frames 22 of the body frame 3, and fuel inside the fuel tank 40 is supplied to the internal combustion engine 34 of the drive device 33. 41 is a cowling.

In FIGS. 1 to 4, a pair of left and right damping force generating means 44, 44, which extend in the front-rear direction and bridge portions 3*a* (front portions) and other portions 3*b* (rear portions) of outer surface sides of the frame bodies 19 in the body frame 3, with front and rear end portions that are end portions being respectively coupled by couplers 42 and 43 to the portions 3*a* and the other portions 3*b*, are disposed. The damping force generating means 44 can dampen an impact force that is applied to the body frame 3 and causes the portions 3*a* and other portions 3*b* to relatively elastically deform so that the portions 3*a* and the other portions 3*b* move towards and away from each other. The damping force generating means 44 are cylinder-format dampers that use a fluid (oil). The damping force generating means 44 extend substantially straight and have the same shape and the same size. When an impact force is applied in one direction (tensile direction) that is the axial direction of the damping force generating means 44, or when an impact force is applied in the direction (compression direction) opposite to the one direction, the damping force generating means 44 extend or contract in the axial direction. In other words, the damping force generating means 44 can dampen the impact force by extending and contracting.

Each coupler 42 and 43 is disposed with a bracket 47, which is fastened by a fastener 46 and supported at outer side surfaces of the frame bodies 19, and a pivot support shaft 48, which pivotally supports the end portions of each damping force generating means 44 at the brackets 47. Each of the damping force generating means 44 is disposed with a cylinder tube 50, which configures an end portion of the damping force generating means 44 and is coupled to the other portions 3*b* of the frame bodies 19 by the couplers 43; an unillustrated piston, which is fitted in the cylinder tube 50 so as to be movable in an axial direction; and a piston rod 51, which extends from the piston to the outside of the cylinder tube 50, configures another end portion of the damping force generating means 44, and is coupled to the portions 3*a* of the frame bodies 19 by the couplers 42. Two pressure oil chambers that are partitioned by the piston inside the cylinder tube 50 communicate with each other through an orifice.

When a driving force of the internal combustion engine 34 is transmitted via the power transmission device 35 to the rear wheel 12 by the driving of the internal combustion engine 34 of the drive device 33, it is possible for the vehicle 1 to travel forward on the traveling road surface 15. Although an impact force is applied to the body frame 3 from the traveling road surface 15 while the vehicle is traveling, via the front and rear wheels 8 and 12, the front fork 6 including the damper 5, the rear arm 10, the link mechanism 13 and the damper 14, the impact force applied to the body frame 3 is alleviated by the dampers 5 and 14.

When the frame bodies 19 of the body frame 3 are elastically deformed (0.1 to 0.2 mm) by the impact force applied to the body frame 3, so as to extend and contract in the front-rear direction (longitudinal direction), and the portions 3*a* and the other portions 3*b* move towards and away from each other, the damping force generating means 44 disposed so as to bridge the frame bodies 19 extend and contract in accompaniment therewith, and the following “action and effects” arise.

That is, “action and effects” arise in that, when the damping force generating means 44 extend and contract, oil flows through the orifice from one of the two pressure oil chambers in each of the cylinder tubes 50 of the damping force generating means 44 to the other chamber, whereby the impact force is damped and each frame body 19 is deterred from being largely elastically deformed frontward and rearward by a reaction force generated in the longitudinal direction of the damping force generating means 44.

Thus, “action and effects” arise in that, for example, when a large impact force is applied to the body frame 3 from the traveling road surface 15 at the time of high-speed cornering in a race, the frame bodies 19 of the body frame 3 try to largely elastically deform in the saddle-type vehicle 1 for which compactness and lightness are demanded. This elastic deformation however, is prevented by the working of the damping force generating means 44 and a sense of being one with the vehicle 1 is ensured for the rider. In other words, as described above, even when the impact force on the body frame 3 is large, steering stability is satisfactorily maintained.

Portions of the frame bodies 19 configuring the rear portions of the main frames 22 are linear portions 19*a* that extend substantially straightly and three-dimensionally. At least one portion of each of the damping force generating means 44 is disposed at lower outward vicinities of the linear portions 19*a* so as to extend substantially parallel to and along the linear portions 19*a*.

For this reason, as described above, even if the damping force generating means 44 are disposed so that steering stability is satisfactorily maintained, the damping force generating means 44 are prevented from projecting largely outward from the frame bodies 19 of the body frame 3, these 19 and 44 are disposed compactly, and the vehicle body 2 is prevented from becoming large.

Here, the portions 3*a* of the frame bodies 19 of the body frame 3 are positioned near support portions of the internal combustion engine 34 of the drive device 33, and the other portions 3*b* are positioned near pivot support portions of the rear arm 10. The support portions of the internal combustion engine 34 of the drive device 33 are portions at which the impact force from the drive device 33 is inputted. The pivot support portions of the rear arm 10 are portions at which the impact force is inputted from the rear wheel 12. Moreover, portions of the frame bodies 19 between the portions 3*a* and the other portions 3*b* include the curved portions.

For this reason, the portions of the frame bodies 19 between the portions 3*a* and the other portions 3*b* tend to be elastically deformed by the impact force, so that they bend up and down and left and right. In other words, the portions 3*a* and the other portions 3*b* tend to be elastically deformed so that they move towards and away from each other. However, the damping force generating means 44 disposed so as to bridge the frame bodies 19 extend and contract with the elastic deformation, whereby the "action and effects" are more reliably achieved.

Because the damping force generating means 44 are disposed at the outer sides of the frame bodies 19 and are disposed so as to bridge the frame bodies 19, when the portions of the frame bodies 19 between the portions 3*a* and the other portions 3*b* are elastically deformed and extend and contract so that they bend left and right, the damping force generating means 44 extend and contract more largely than the extension and contraction of the portions of the frame bodies 19, whereby the "action and effects" are even more reliably achieved.

The fasteners 36 that support the internal combustion engine 34 of the drive device 33 at the frame bodies 19 and the fasteners 46 of the couplers 42 are mutually shared, whereby the configuration is simplified. Also, the fasteners 46 of the couplers 43 are disposed on an axial center of the pivot support shaft 9.

As shown by the single-dot chain line in FIG. 1, the portions 3*a* may serve as the front end portions of the frame bodies 19 near the head pipe 18 and the other portions 3*b* may serve as the extension end portions of the frame bodies 19, so that damping force generating means 44(A) may be disposed so as to bridge the frame bodies 19.

Here, the front end portions of the frame bodies 19 are portions at which a large impact force is inputted from the outside via the front fork 6 from the front wheel 8. The extension end portions of the frame bodies 19 are portions at which a large impact force is inputted from the rear arm 10 and the drive device 33, and the portions of the frame bodies 19 between the portions 3*a* and the other portions 3*b* include the curved portions.

For this reason, the portions of the frame bodies 19 between the portions 3*a* and the other portions 3*b* tend to be elastically deformed by the impact force, so that they largely bend up and down and left and right. In other words, the portions 3*a* and the other portions 3*b* tend to be elastically deformed so that they move towards and away from each other. However, the damping force generating means 44(A) disposed so as to bridge the frame bodies 19 extend and contract with the elastic deformation, whereby the "action and effects" are more reliably achieved.

Also, as shown by the single-dot chain line in FIGS. 1 and 2, damping force generating means 44(B) may be disposed so as to extend in the width direction of the vehicle 1, the damping force generating means 44(B) may be disposed so as to bridge the front portions of the left and right frame bodies 19, 19 (intermediate portions in the longitudinal direction of the main frames 22) of the body frame 3, and end portions of the damping force generating means 44(B) may be coupled by the couplers 42 and 43 to the portion 3*a* of one frame body 19 of the left and right frame bodies 19, 19 and to the other portion 3*b* of the other frame body 19.

Here, the left and right frame bodies 19, 19 have curved shapes that are outwardly convex when the vehicle body 2 is seen in plan view, their cross sections are long shapes, and they are respectively and separately elastically deformed by the impact force, so that they easily bend in the width direction of the vehicle body 2. Additionally, when the left and right frame bodies 19, 19 are elastically deformed so that they largely move towards and away from each other, the portions 3*a* and the other portions 3*b* largely move towards and away from each other in accompaniment with this elastic deformation, whereby the damping force generating means 44(B) disposed so as to bridge the left and right frame bodies 19, 19 extend and contract, whereby the "action and effects" are effectively achieved.

It should be noted that, as shown by the single-dot chain line in FIG. 1, damping force generating means 44(C) extending in the width direction of the vehicle 1 may also be disposed so as to bridge the curved portions of the left and right frame bodies 19.

Although the above depends on the illustrated example, the vehicle 1 may be a three-wheeled motor vehicle or a four-wheeled motor vehicle as long as it is a saddle type. Also, the damping force generating means 44 may be disposed in internal spaces of the frame bodies 19 whose cross sections are of a box-like shape, and may be disposed to bridge the portions 3*a* and the other portions 3*b* of inner surface sides of the frame bodies 19. Also, these portions 3*a* and other portions 3*b* may also be portions of upper and lower surfaces, regardless of whether they are disposed at the outer or inner surface sides of the frame bodies 19. Also, the end portion (front end portion) of the damping force generating means 44 may be coupled to the front portion of one of the left and right frame bodies 19, 19 and the other end portion (rear end portion) of the damping force generating means 44 may be coupled to the rear portion of the other frame body 19.

Also, the frame bodies 19 may be a single body extending rearward from the head pipe 18 and may be configured by a simple circular pipe. In this case, the damping force generating means 44 may also be made singular.

Also, an end portion of the damping force generating means 44 may be coupled to the head pipe 18 and the other end portion may be coupled to one of the cross members 20 and 21. In this case, the head pipe 18 and the cross member 20 function as a partial configuration of the couplers 42 and 43.

Also, the damping force generating means 44 may be means where the piston frictionally slides with respect to the cylinder tube 50 without using a fluid. Also, the damping force generating means 44 may include a rubber-made elastic body that is vulcanized and adhered to the cylinder tube 50 and the piston rod 51 and in which sheering stress is generated on the basis of the impact force, with the cylinder tube 50 and the piston rod 51 being mutually joined together by the elastic body, without using a fluid and a piston.

Moreover, the damping force generating means 44 may be disposed with a damper body, in which a fluid is used in a rotary format supported at the portions 3*a* of the frame bodies 19, and an interlocking rod that couples the damper body and the other portions 3*b* of the frame bodies 19.

Figure 5:
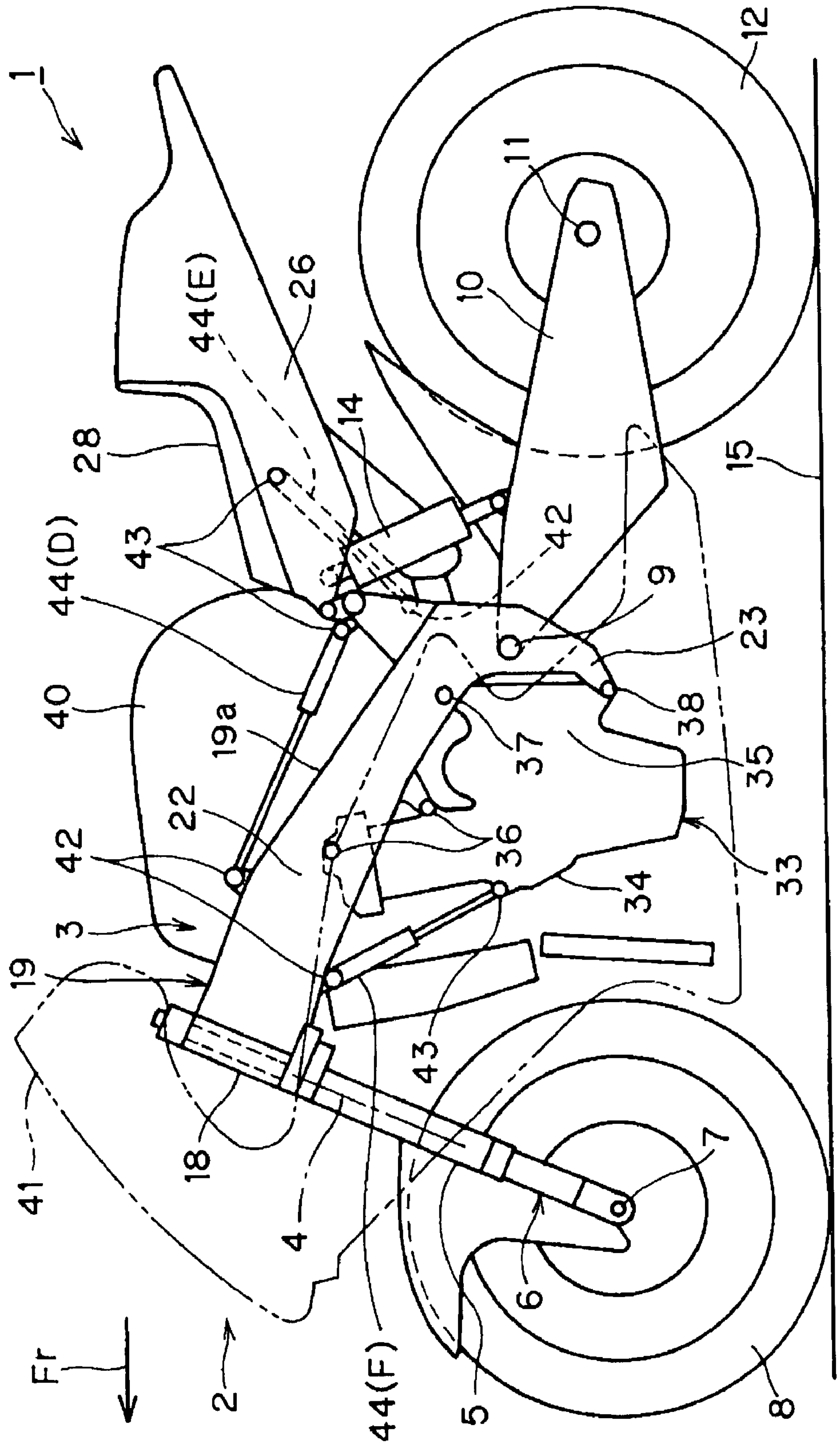
FIG. 5 illustrates a second embodiment of the present invention.
Figure 6:
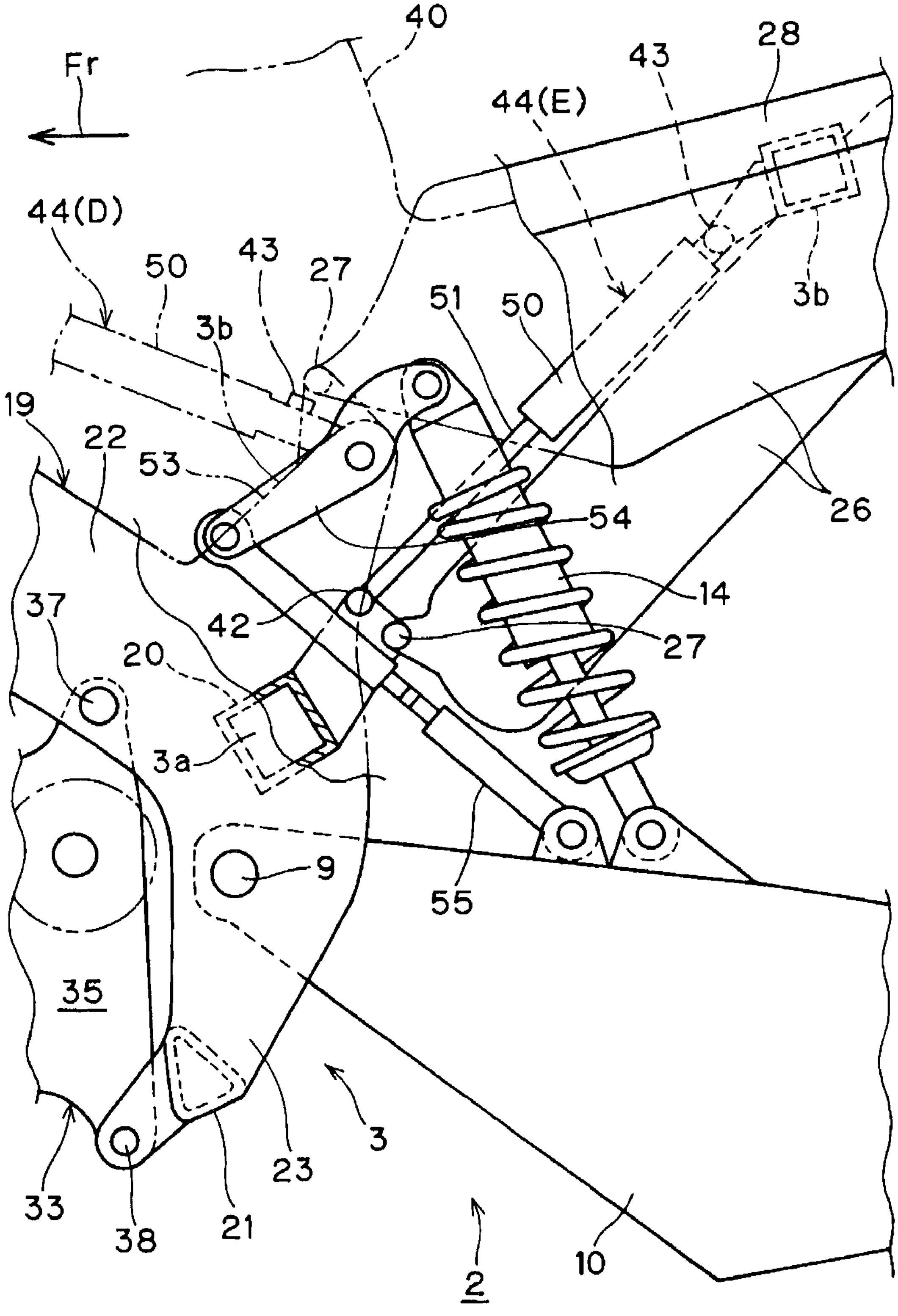
FIG. 6 illustrates a partially enlarged view of FIG. 5 and a view corresponding to FIG. 1, according to the second embodiment of the present invention.
Figure 7:
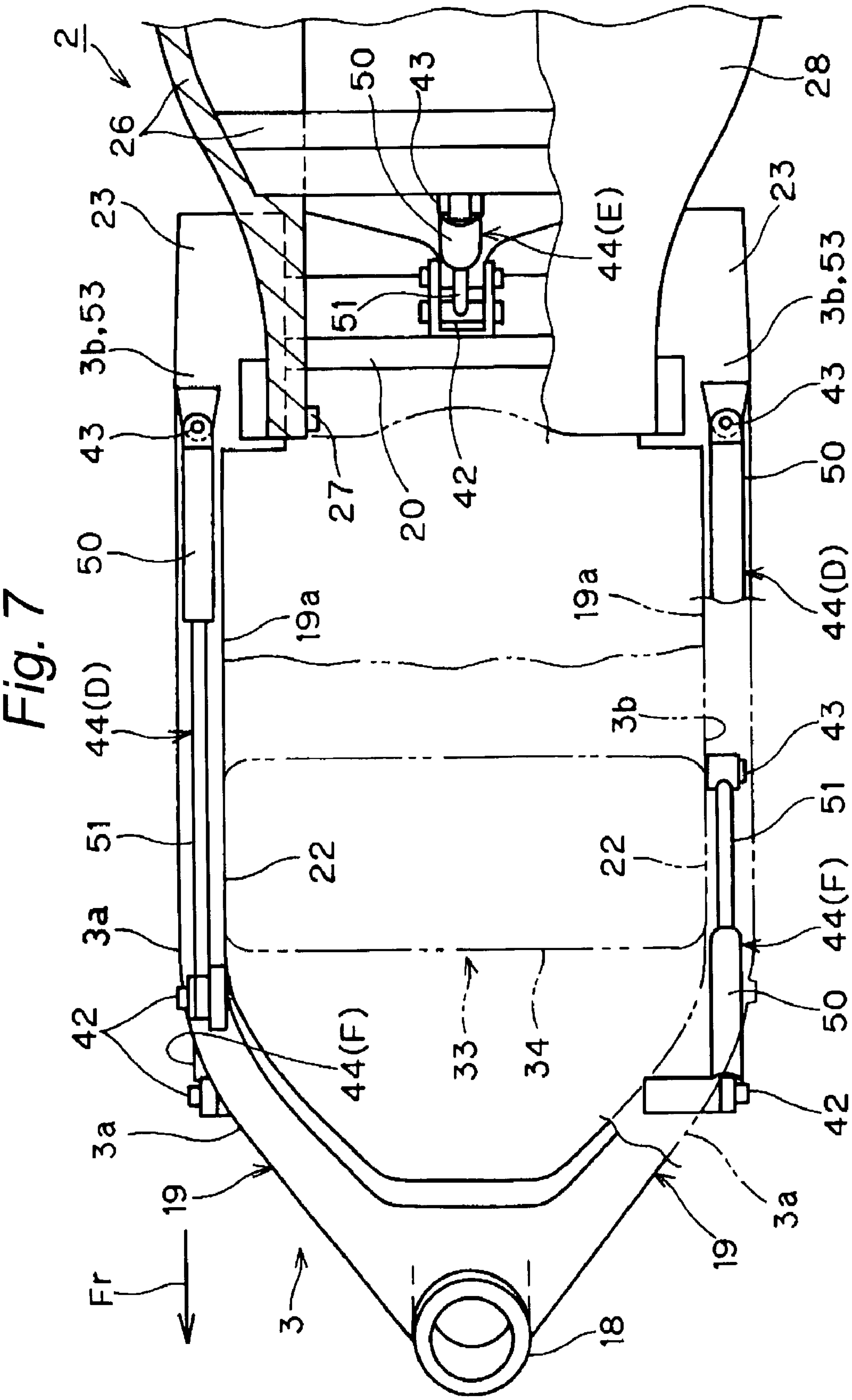
FIG. 7 illustrates a view corresponding to FIG. 3 according to the second embodiment of the present invention.

FIGS. 5 to 7, which will be described below, show a second embodiment. In this embodiment, many points are shared in common with the first embodiment in terms of configuration, action and effects. Thus, with respect to these points shared in common, common reference numerals will be given to the drawings, overlapping description thereof will be omitted, and description will be given mainly in regard to points of difference. Also, in light of the aspects, action and effects of the invention, the configurations of portions in these embodiments may be variously combined.

(Second Embodiment)

FIGS. 5 to 7 show the second embodiment.

According to this, the damper 14 is disposed as a left and right pair. The body frame 3 is disposed with brackets 53 that are respectively disposed so as to protrude upward from the joint portions at which the rear end portions of the main frames 22 and the upper end portion of the rear arm brackets 23 are joined. Intermediate portions of swinging arms 54 that respectively extend in the front-rear direction with respect to protruding end portions of the left and right brackets 53 are pivotally supported. Upper end portions of the dampers 14 are pivotally supported at end portions (rear end portions) of the swinging arms 54, and lower end portions of the dampers 14 are pivotally supported at the rear arms 10. Also, turn buckle-format regulation bars 55, which are respectively disposed forward of the dampers 14, extend along the dampers 14, and whose respective lengths are adjustable in the axial direction, are disposed. Additionally, upper end portions of the regulation bars 55 are pivotally supported at other end portions (front end portions) of the swinging arms 54, and lower end portions of the regulation bars 55 are pivotally supported at the rear arm 10. By adjusting the lengths of the regulation bars 55, damper characteristics of the dampers 14 are possible.

A pair of left and right damper force generating means 44(D), which extend in the front-rear direction, are disposed so as to bridge the portions 3*a* (front portions) and the other portions 3*b* (rear portions) of the outer surface sides of the frame bodies 19 in the body frame 3, and are respectively coupled by the couplers 43, 43 to the portions 3*a* and the portions 3*b*, is disposed.

The damping force generating means 44(D) are positioned near upper portions of linear portions 19*a* of the main frames 22 of the frame bodies 19. For this reason, even if the damping force generating means 44(D) are disposed, the width dimension of the vehicle body 2 is prevented from becoming larger, which is particularly beneficial with respect to the saddle-type vehicle 1 for which a compact width dimension of the vehicle body 2 is demanded.

Also, damping force generating means 44(E), which are disposed so as to bridge the frame bodies 19 and the seat bracket 26 via the upper cross member 20 and are respectively coupled by the couplers 42 and 43 to the frame bodies 19 and the seat bracket 26, are disposed.

Here, the seat bracket 26 supporting the seat 28 projects from the frame bodies 19 and is cantilever-supported. When an impact force is applied to the body frame 3, the seat bracket 26 is elastically deformed more than other portions and tends to be largely relatively displaced with respect to the frame bodies 19. However, in this case the damping force generating means 44(E) extend and contract, whereby the "action and effects" are more reliably achieved.

Also, a pair of left and right damping force generating means 44(F), 44(F), which are disposed so as to bridge the frame bodies 10 and the internal combustion engine 34 and are respectively coupled by the couplers 42 and 43 to the frame bodies 19 and the internal combustion engine 34, is disposed.

Here, there is a large difference—particularly with respect to weight, specific gravity and rigidity—between the internal combustion engine 34 and the frame bodies 19 of the body frame 3. Thus, when an impact force is applied to the body frame 3, the frame bodies 19 tend to be largely elastically deformed in comparison to the internal combustion engine 34 and more largely relatively displaced with respect to the internal combustion engine 34. However, in this case, the damping force generating means 44(F) extend and contract, whereby the "action and effects" are more reliably achieved.

Although the above depends on the illustrated example, it is not necessary to dispose all of the damping force generating means 44(D–F) at the same time.

Effects according to the invention are as follows.

According to the present invention, a body frame damping structure in a saddle-type vehicle includes a front fork steerably supported at a front end portion of a body frame; a front wheel supported at lower end portions of the front fork; a rear arm pivotally supported at a rear portion of the body frame by a pivot support shaft so as to be swingable up and down; and a rear wheel supported at a swinging end of the rear arm.

The damping force generating means are disposed so as to bridge portions of the body frame with other portions of the body frame, with the damping force generating means being respectively coupled to the portions and the other portions.

For this reason, when the body frame is elastically deformed by the impact force applied to the body frame at the time the vehicle is traveling, the impact force is damped by the damping force generating means bridging the body frame, and the body frame is deterred from being largely elastically deformed by a reaction force generated in the damping force generating means.

Thus, for example, when a large impact force is applied to the body frame from a traveling road surface at the time of high-speed cornering in a race, the body frame tries to largely elastically deform in the saddle-type vehicle for which compactness and lightness are demanded, but this elastic deformation is prevented by the working of the damping force generating means and a sense of being one with the vehicle is ensured for the rider. In other words, as described above, even when the impact force on the body frame is large, steering stability is satisfactorily maintained.

The body frame includes a head pipe, which configures the front end portion of the body frame and supports the front fork, and a frame body, which extends rearward and downward from the head pipe and pivotally supports the rear arm at extension portions of the frame body, the frame body being disposed with linear portions that extend substantially straightly.

The damping force generating means are disposed at outward vicinities of the linear portions so as to extend along the linear portions.

For this reason, as described above, even if the damping force generating means are disposed so that steering stability is satisfactorily maintained, the damping force generating means are prevented from projecting largely outward from the frame bodies of the body frame. Since these are disposed compactly, the vehicle body is prevented from becoming large, and the damping force generating means are prevented from becoming an obstacle to a rider, which is particularly beneficial to a saddle-type vehicle.

Moreover, because the damping force generating means are disposed so as to bridge outer portions of the frame bodies, firstly, they can be disposed regardless of the cross-sectional shape of the frame bodies, the degree of freedom of their disposal is improved, and it also becomes possible to dispose them later with respect to existing body frames. Also, secondly, when the damping force generating means are disposed, constraints attendant to the cross-sectional shape of the body frame can be avoided and molding of the body frame can be easily achieved.

The frame body includes a pair of left and right frame bodies and the damping force generating means is disposed so as to extend in a width direction of the vehicle and bridge the left and right frame bodies, with the damping force generating means being coupled to the frame bodies.

Here, the left and right frame bodies are respectively and separately elastically deformed by the impact force so that they bend and tend to largely move towards and away from each other. However, in this case, the damping force generating means disposed so as to bridge the left and right frame bodies extends and contracts, whereby the action and effects of the present invention is reliably achieved.

A further embodiment of the present invention is a body frame damping structure in a saddle-type vehicle includings a front fork steerably supported at a front end portion of a body frame; a front wheel supported at lower end portions of the front fork; a rear arm pivotally supported at a rear portion of the body frame by a pivot support shaft so as to be swingable up and down; and a rear wheel supported at a swinging end of the rear arm. The body frame includes a head pipe, which configures the front end portion of the body frame and supports the front fork, a frame body, which extends rearward and downward from the head pipe and pivotally supports the rear arm at extension portions of the frame body, and a seat bracket, which projects rearward from the frame body and supports a seat.

The damping force generating means are disposed so as to bridge the frame body and the seat bracket, with the damping force generating means being respectively coupled to the frame body and the seat bracket.

Here, the seat bracket supporting the seat projects from the frame bodies and is cantilever-supported. When the impact force is applied to the body frame, the seat bracket is elastically deformed more than other portions and tends to be largely relatively displaced with respect to the frame bodies. However, in this case, the damping force generating means extends and contracts.

Another embodiment of the present invention is a body frame damping structure in a saddle-type vehicle including a front fork steerably supported at a front end portion of a body frame; a front wheel supported at lower end portions of the front fork; a rear arm pivotally supported at a rear portion of the body frame by a pivot support shaft so as to be swingable up and down; and a rear wheel supported at a swinging end of the rear arm. The body frame including a head pipe, which configures the front end portion of the body frame and supports the front fork, a frame body, which extends rearward and downward from the head pipe and pivotally supports the rear arm at extension portions of the frame body, and an internal combustion engine, which is supported at the frame body and is interlocked and coupled with the rear wheel.

The damping force generating means are disposed so as to bridge the frame body and the internal combustion engine, with the damping force generating means being respectively coupled to the frame body and the internal combustion engine.

Here, there is a large difference—particularly with respect to weight, specific gravity and rigidity—between the internal combustion engine and the frame bodies of the body frame. Thus, when an impact force is applied to the body frame, the frame bodies tend to be largely elastically deformed in comparison to the internal combustion engine and more largely relatively displaced with respect to the internal combustion engine. However, in this case, the damping force generating means extend and contract.

The damping force generating means damp an impact force applied in one direction to the damping force generating means and an impact force applied in a direction opposite to the one direction.

For this reason, the damping force generating means damp impact forces in both of one direction with respect to the damping force generating means and the direction opposite thereto, and more effectively suppress elastic deformation of the body frame.

What is claimed is:

1. A body frame damping structure in a saddle vehicle comprising:

a front fork steerably supported at a front end portion of a body frame;

a front wheel supported at lower end portions of the front fork;

a rear arm pivotally supported at a rear portion of the body frame by a pivot support shaft so as to be swingable up and down;

a rear wheel supported at a swinging end of the rear arm; and means for generating a damping force disposed so as to bridge a first portion of the body frame with a second portion of the body frame, with means for generating a damping force being respectively coupled to the first and second portions of the body frame, wherein the second portion of the body frame comprises the pivot support shaft, and wherein the pivot support shaft pivotally supports end portions of the means for generating the damping force.

2. The body frame damping structure in a saddle vehicle of claim 1, wherein the body frame includes:

a head pipe, which configures the front end portion of the body frame and supports the front fork;

and a frame body, which extends rearward and downward from the head pipe and pivotally supports the rear arm at extension portions of the frame body, the frame body being disposed with linear portions that extend substantially straight and means for generating a damping force disposed at outward vicinities of the linear portions so as to extend along the linear portions.

3. The body frame damping structure in a saddle vehicle of claim 1, wherein the frame body comprises a pair of left and right frame body and the means for generating a damping force is disposed so as to extend in a width direction of the vehicle and bridge the left and right frame bodies, with the means for generating a damping force being coupled to the frame bodies.

4. A body frame damping structure in a saddle vehicle comprising:

a front fork steerably supported at a front end portion of a body frame;

a front wheel supported at lower end portions of the front fork;

a rear arm pivotally supported at a rear portion of the body frame by a pivot support shaft so as to be swingable up and down;

a rear wheel supported at a swinging end of the rear arm; and dampers disposed so as to bridge a first portion of the body frame with a second portion of the body frame, with dampers being respectively coupled to the first and second portions of the body frame, wherein the second portion of the body frame comprises the pivot support shaft, and wherein the pivot support shaft pivotally supports end portions of the dampers.

5. The body frame damping structure in a saddle vehicle of claim 4, wherein the body frame includes:

a head pipe, which configures the front end portion of the body frame and supports the front fork, and a frame body which extends rearward and downward from the head pipe and pivotally supports the rear arm at extension portions of the frame body, the frame body being disposed with linear portions that extend substantially straight, and the dampers are disposed at outward vicinities of the linear portions so as to extend along the linear portions.

6. The body frame damping structure in a saddle vehicle of claim 4, wherein the frame body comprises:

a pair of left and right frame bodies, and the dampers are disposed so as to extend in a width direction of the vehicle and bridge the left and right frame bodies, with the dampers being coupled to the frame bodies.

7. The body frame damping structure in a saddle vehicle of claim 6, further comprising couplers disposed with a bracket that is fastened by a fastener and supported by an outer side surface of the frame bodies.

8. The body frame damping structure in a saddle vehicle of claim 7, wherein the pivot support shaft pivotally supports end portions of each damper at the brackets.

9. The body frame damping structure in a saddle vehicle of claim 4, wherein the dampers damp a first impact force applied in one direction with respect to the dampers and a second impact force applied in a direction opposite to the one direction.

10. The body frame damping structure in a saddle vehicle of claim 4, wherein the dampers are cylinder-format dampers that use a fluid.

11. The body frame damping structure in a saddle vehicle of claim 10, wherein the fluid is oil.

12. The body frame damping structure in a saddle vehicle of claim 4, wherein the dampers are disposed in a cylinder tube.

13. The body frame damping structure in a saddle vehicle of claim 12, further comprising oil chambers disposed in the cylinder tube, wherein the oil chambers are partitioned by a piston.

* * * * *